Nov. 3, 1959     J. W. ROBINSON     2,911,101
FILTERS
Filed Aug. 19, 1955     2 Sheets-Sheet 1
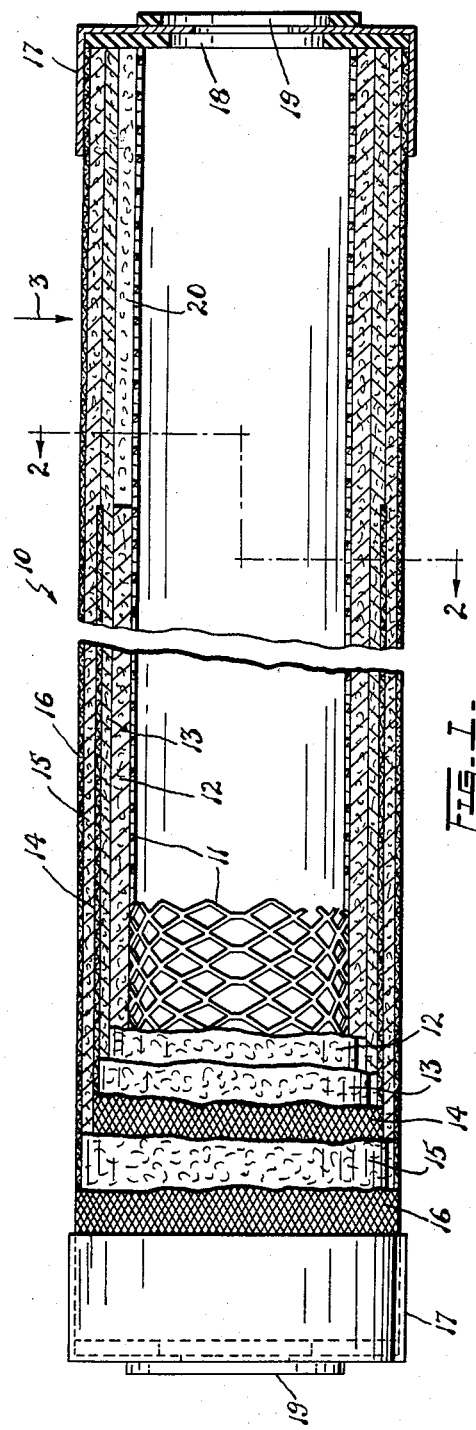
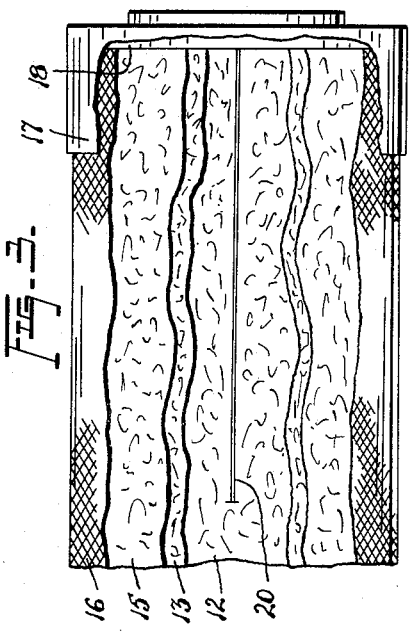
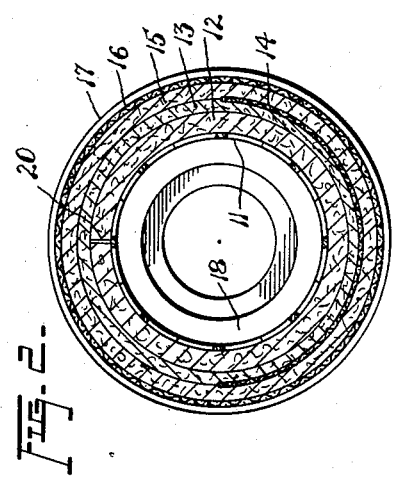
Inventor:
J. W. Robinson
By
Atty.

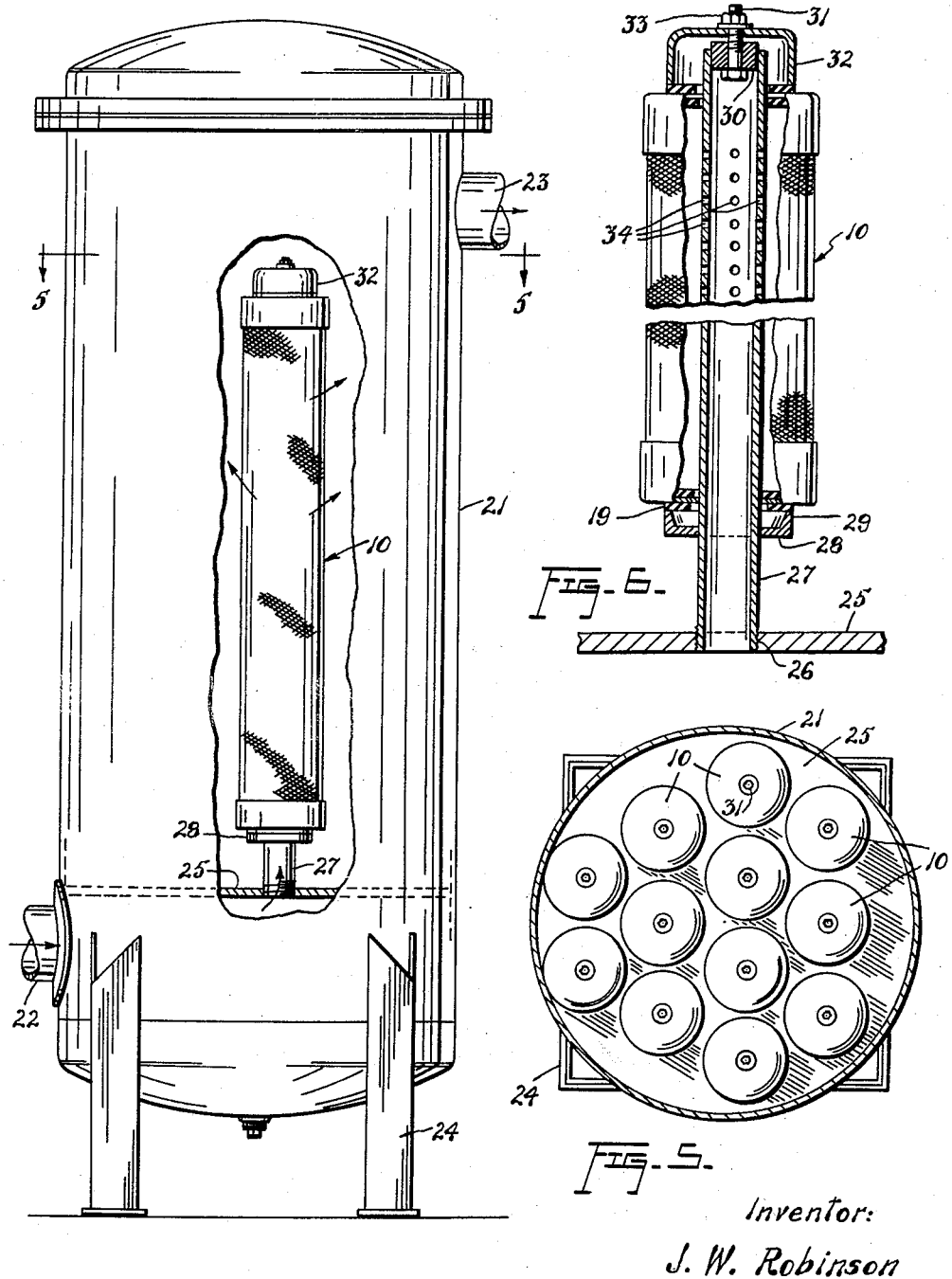

United States Patent Office 2,911,101
Patented Nov. 3, 1959

2,911,101

FILTERS

John W. Robinson, Richmond, Va., assignor to Richmond Engineering Co., Inc., Richmond, Va.

Application August 19, 1955, Serial No. 529,496

4 Claims. (Cl. 210—458)

This invention relates to new and useful improvements and structural refinements in the art of filtering, and concerns itself with filtering apparatus intended for demulsification of liquid systems, generally referred to as emulsions wherein one liquid is mechanically dispersed within another, both liquids being substantially immiscible. In addition, the invention also concerns itself with filtering apparatus for removal of particulate matter from fluids of any nature. Moreover, the invention relates to apparatus wherein both of the above stated functions may be effected simultaneously.

The principal object of the invention is to provide an expendable, cartridge type filter-coalescer element wherein the functions of filtering and demulsification are accomplished by the passage of contaminated fluids through certain porous media embodied in the cartridge element.

An important feature of the invention, therefore, resides in the particular structural arrangement of the filter cartridge, while another important feature resides in the provision of novel means for mounting the cartridge in situ in a filtering apparatus.

Some of the advantages of the invention reside in its simplicity of construction, in its efficient operation, and in its adaptability to economical manufacture.

With the foregoing more important objects and features in view and such other objects and features as may become apparent as this specification proceeds, the invention resides in the arrangement of parts and details of construction substantially as shown in the accompanying drawings, wherein like characters of reference are used to designate like parts and wherein:

Figure 1 is a longitudinal view of the filter-coalescer cartridge constructed in accordance with this invention, the same being partially broken away and in section to reveal its construction;

Figure 2 is a cross-sectional view, taken substantially in the plane of the line 2—2 in Figure 1;

Figure 3 is a fragmentary elevational view, also partially broken away and taken in the direction of the arrow 3 in Figure 1;

Figure 4 is an elevational view of a filtering apparatus, partially broken away to reveal the cartridge therein;

Figure 5 is a cross-sectional view, taken substantially in the plane of the line 5—5 in Figure 4; and Figure 6 is a vertical sectional detail illustrating the cartridge mounting means.

Referring now to the accompanying drawings in detail, particularly to Figures 1–3 thereof, the filter-coalescer cartridge is designated generally by the reference numeral 10 and embodies in its construction a rigid tubular core 11 having a foraminous wall, preferably constructed from expanded metal. An inner tubular jacket 12 of porous filtering material such as fiberglass is positioned on the core 11 and is covered by a second tubular jacket 13 of similar material, as shown.

A screen wrapper 14 is positioned on and embraces the second jacket 13 along a portion of its length, while an outer tubular jacket 15 of porous filtering material such as fiberglass covers the screen wrapper 14 as well as the exposed portion of the second jacket 13 which is not embraced by the wrapper 14. Finally, a screen cover 16 is provided on the outer jacket 15.

The several components of the cartridge are held together by rigid end caps 17 of metal, or the like, and inner and outer gaskets 18, 19, respectively, of suitable material are provided at the end caps, as illustrated.

The jacket 12, as shown, is relatively thick as compared with the thickness of the two outer jackets 13 and 15 and is composed of a large number of glass fibers sintered together with adhesive resin to form a porous matrix which is permeable to fluids but not necessarily permeable to all solids. The density of the matrix and the diameter of the fibers have bearing on the size and quantity of solid particles which the jacket 12 will retain, and the primary purpose of the jacket 12 herein is to retain the bulk of the larger sized solid particles while permitting relatively smaller particles to pass therethrough to the intermediate jacket 13 which retains a portion at least of the finer particles while passing the liquid mixture or emulsion to the outer jacket 15 which is composed of fibrous material of fine fiber size and density and whose principal function is to coalesce the dispersed liquid component of the emulsion.

It may be stated at this point that the cartridge is intended to withstand moderate pressure differential produced by resistance to flow of fluids therethrough. Inasmuch as the screen wrapper 14 embraces only a portion of the length of the jacket 13 and binds the same against the underlying portion of the jacket 12, the portion of the jacket 13 which is not embraced and bound by the wrapper 14 may expand outwardly to some extent under moderate fluid pressure and form a pocket between itself and the jacket 12 for the reception of particulate matter passing hrough the latter. To assist in this action, the portion of the jacket 12 disposed under that portion of the intermediate jacket 13 which is not covered by the wrapper 14 is provided with a longitudinal slit 20 which affords a passage or entrance for the particulate matter to such pocket.

If for convenience of manufacture the jacket 12 should be slit along its entire length, the bonding action of the wrapper 14 and jacket 13 upon the jacket 12 would retain the slit closed except for the pocket entrance portion 20 which the wrapper 14 does not cover. It is to be particularly noted that the above mentioned feature of accommodating particulate matter in a pocket between the jackets 12, 13 permits a greater area of filter surface to remain open in the unpocketed portion of the cartridge for the passage of fluid therethrough, thus substantially prolonging the useful life of the device.

Such fine solid particles as pass through the jackets 12, 13 eventually enter the outer jacket 15 where they are finally retained. The jacket 15 also serves another important function, namely, that of coalescing the dispersed liquid passing through with the principal liquid in the act of demulsification. While some coalescence may take place during the passage of such liquids through the jackets 12, 13, the fine fiber size and density of the matrix in the outer jacket 15 may be relied upon for excellence in the performance of demulsification.

The screen wrapper 14 and the screen cover 16 are formed from suitable mesh material, preferably composed of twisted glass filaments coated with a suitable thermoplastic resin such as polyvinyl chloride. The screening is placed in position so that longitudinal edges thereof are overlapped, whereupon heat and pressure are applied simultaneously thereto, causing the thermo-plastic coating to soften and adhere, thus forming a fitted shell.

In practice, a principal liquid hydrocarbon such as kerosene, for example, contaminated with finely divided water and/or solid particles is caused to flow through the cartridge from the inside to the outside. The principal liquid readily emerges in an unaltered condition after passing through the jackets 12, 13, 15, while the solid contaminant is retained with the jackets and water is coalesced into large droplets of sufficient size for separation from the principal liquid by gravity, whereupon said droplets fall to the bottom of the containing vessel.

The accompanying Figures 4-6 illustrate the cartridge 10 mounted in a filtering apparatus including a suitable vertically elongated tank 21 having a fluid inlet 22 and a fluid outlet 23 in the respective lower and upper portions thereof and supported by suitable leg structure 24.

A transverse partition plate 25 is provided in the lower portion of the tank above the inlet 22 and if the apparatus is intended to accommodate a plurality of the cartridges 10 as shown in Figure 5, the plate 25 is provided with a corresponding plurality of openings 26 in which lower ends of vertical pipes 27 are threaded. Each of these pipes supports one of the cartridges 10, this being achieved by providing the lower end portion of the pipe with an annular flange 28 having an upturned, tapered lip 29 is supportable, sealing abutment with the gasket 19 at the lower end of the cartridge. The upper end of the pipe is provided with a closure plug 30 having a stud 31 extending through the same, and a dome-shaped cap 32 is positioned on this stud, as shown. A clamping nut 33, positioned on the stud 31, is used to press the lower edge of the cap 32 in sealing engagement with the gasket 19 at the upper end of the cartridge.

The upper end portion of each pipe 27 is formed with a set of apertures 34, whereby fluid passing from the inlet 22 through the pipes may enter the inside of the cartridges for filtering thereby and subsequent discharge through the outlet 23 of the tank. It is to be noted that when the cartridges are positioned vertically as shown, the aforementioned slit, pocket forming portion of each cartridge is placed toward the bottom so that particulate matter may gather therein under assistance of gravity.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. In a filter cartridge, the combination of a rigid tubular core having a foraminous wall, an inner annular jacket of porous filtering material provided on said core, a second annular jacket of porous filtering material superposed on said inner jacket, means embracing said second jacket along a portion of its length whereby to bind the same against said inner jacket but permit the unbound portion of the second jacket to expand outwardly to form a pocket therebetween and the inner jacket, said inner jacket being provided with a slit constituting an entrance for particulate matter to said pocket, means for supplying fluid to be filtered to the interior of the cartridge, and means for withdrawing filtered material from the exterior of the cartridge.

2. The device as defined in claim 1 wherein said means comprises a screen wrapper provided along a portion of the length of said second jacket.

3. A filter cartridge comprising a rigid tubular core having a foraminous wall, an inner annular jacket of porous filtering material provided on said core, a second annular jacket of porous filtering material superposed on said inner jacket, a screen wrapper embracing said second jacket along a portion of its length whereby to bind the same against said inner jacket but permit the unbound portion of the second jacket to expand outwardly to form a pocket therebetween and the inner jacket, said inner jacket being provided with a slit constituting an entrance for particulate matter to said pocket, an outer annular jacket for porous filtering material superposed on said screen wrapper and on said unbound portion of said second jacket, an annular screen cover superposed on said outer jacket, means for supplying fluid to be filtered to the interior of the cartridge, and means for withdrawing filtered material from the exterior of the cartridge.

4. A filter cartridge for emulsion treatment as set forth in claim 1 wherein the outer jacket is composed of glass fibers of fine fiber size.

References Cited in the file of this patent

UNITED STATES PATENTS

| | | |
|---|---|---|
| 1,718,385 | Sherwood | June 25, 1929 |
| 2,395,449 | Briggs | Feb. 26, 1946 |
| 2,657,808 | Mankin | Nov. 3, 1953 |
| 2,692,686 | Fleck et al. | Oct. 26, 1954 |
| 2,701,062 | Robinson | Feb. 1, 1955 |
| 2,732,031 | Rabbitt et al. | Jan. 24, 1956 |
| 2,749,265 | Fricke et al. | June 5, 1956 |

FOREIGN PATENTS

| | | |
|---|---|---|
| 802,777 | France | June 13, 1936 |
| 602,429 | Great Britain | May 26, 1948 |